United States Patent [19]

Lemmer et al.

[11] Patent Number: 5,175,458
[45] Date of Patent: Dec. 29, 1992

[54] INSULATOR FOR TERMINATING ELECTRODYNAMIC STATOR COILS

[75] Inventors: Jerome J. Lemmer, Oakdale; Gary B. O'Malley, Fridley, both of Minn.

[73] Assignee: Onan Corporation, Minneapolis, Minn.

[21] Appl. No.: 754,645

[22] Filed: Sep. 4, 1991

[51] Int. Cl.⁵ .................................. H02K 11/00
[52] U.S. Cl. ........................................ 310/71
[58] Field of Search ............ 310/40 MM, 42, 71, 208; 29/596

[56] References Cited

U.S. PATENT DOCUMENTS

| | | |
|---|---|---|
| 2,511,693 | 6/1950 | Burghoff . |
| 3,071,750 | 1/1963 | Heselwood . |
| 3,304,447 | 2/1967 | Lindt . |
| 3,355,801 | 12/1967 | Priddy . |
| 3,603,825 | 9/1971 | Sheridan et al. . |
| 3,974,407 | 8/1976 | Dochterman ............ 310/71 |
| 3,979,615 | 9/1976 | Neff ..................... 310/71 |
| 3,984,908 | 10/1976 | Ackley . |
| 4,003,128 | 1/1977 | Dochterman . |
| 4,038,573 | 7/1977 | Hillyer et al. ............ 310/71 |
| 4,130,331 | 12/1978 | Neff et al. . |
| 4,177,397 | 12/1979 | Lill ..................... 310/71 |
| 4,181,393 | 1/1980 | Lill . |
| 4,215,464 | 8/1980 | Miller .................... 310/71 |
| 4,287,446 | 9/1981 | Lill et al. . |
| 4,322,647 | 3/1982 | Neroda et al. ............ 310/71 |
| 4,340,829 | 7/1982 | McCoy . |
| 4,513,214 | 4/1985 | Dieringer . |
| 4,642,885 | 2/1987 | King . |
| 4,656,378 | 4/1987 | Atherton et al. .......... 310/71 |
| 4,673,834 | 6/1987 | Wrobel . |
| 4,694,560 | 9/1987 | Barrera . |
| 4,851,725 | 7/1989 | Keck . |
| 4,894,571 | 1/1990 | Hildebrandt et al. . |
| 4,904,893 | 2/1990 | Snider et al. . |
| 4,922,604 | 5/1990 | Marshall et al. . |
| 4,926,540 | 5/1990 | Kato . |
| 4,964,210 | 10/1990 | Takagi . |

OTHER PUBLICATIONS

*AMP Special Terminals and Splices for Automatic Machine Applications,* Catalog No. 76-385, Aug. 1977.
*AMP Terminal MAG-MATE TM Standard Series,* Catalog No. 1250-16, Oct. 1985.
*AMP Magnet Wire Terminals,* Catalog No. 87-871, pp. 15-29, Jul. 1989.

*Primary Examiner*—Steven L. Stephan
*Assistant Examiner*—E. To
*Attorney, Agent, or Firm*—Merchant, Gould, Smith, Edell, Welter & Schmidt

[57] ABSTRACT

A stator termination assembly comprising a gate member, a terminator, terminals, a terminator cover and electrical plug assemblies. The preferred assembly comprises an arcuate gate member having that operate to lead a stator magnet wire extension from stator lamination assembly to a terminal where a solderless electrical connection can be made. The terminator accepts stator magnet wire extensions and terminals so that an electrical connection can be made. A terminator cover helps secure and align the terminals into the terminator so that an electrical connection can be made between the terminals and an electrical plug assembly.

23 Claims, 12 Drawing Sheets

FIG. 2
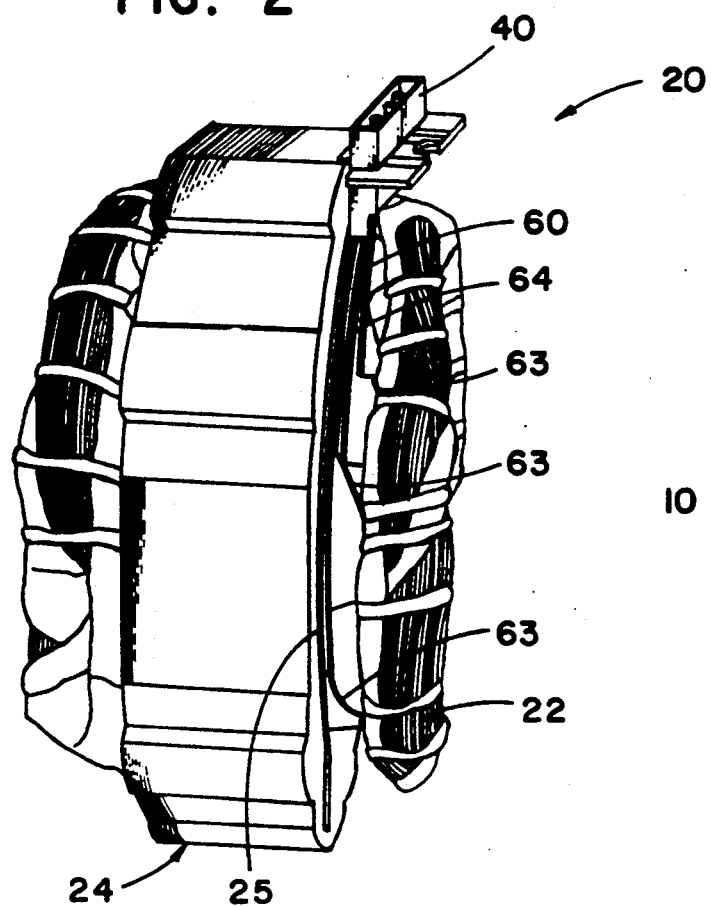
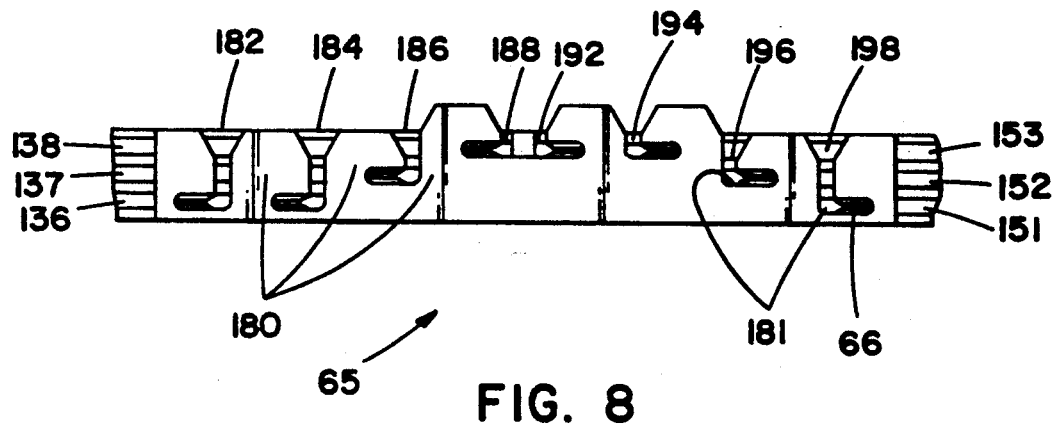
FIG. 8

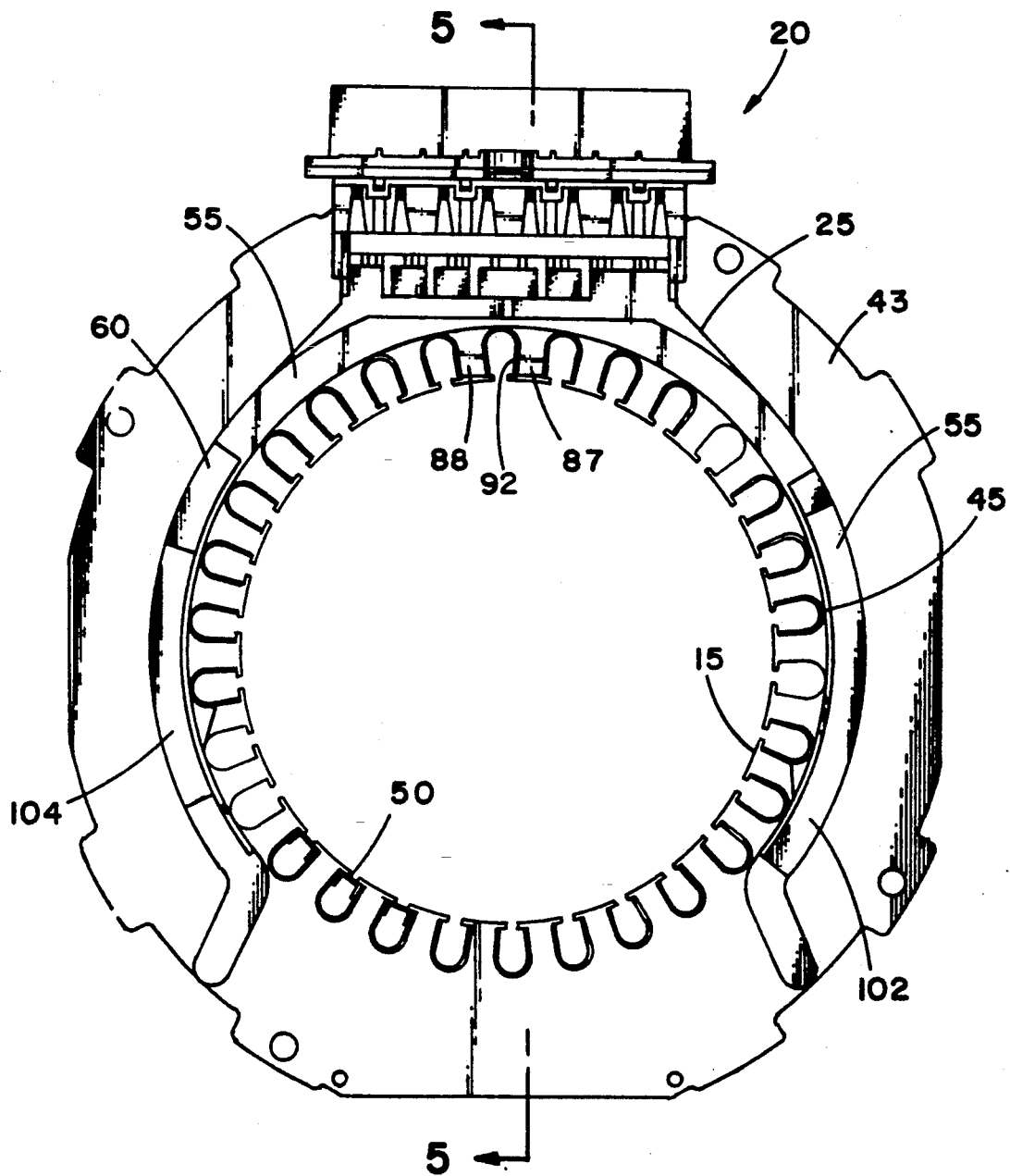

INSULATOR FOR TERMINATING ELECTRODYNAMIC STATOR COILS

FIELD OF INVENTION

This invention relates to the field of electrical motors and generators, and particularly to methods and arrangements for terminating motor and generator stators.

BACKGROUND OF THE INVENTION

A typical generator includes: a rotor comprising a rotor shaft, field windings, rotor laminations and a collector ring; and a stator, including stator windings, stator laminations and output leads. The stator typically has one or more different stator windings (magnet wires) coiled around its laminations. The stator may include excitation, quadrature, battery charge and/or power windings. These windings (coils) are usually connected to flexible lead wires which electrically connect the stator portion of the generator to the load.

Conventional prior methods of terminating stator magnet wires typically required several steps. First, various types of stator magnet wires coming off the stator portion of the generator had to be identified (each typically identified as winding extensions or coil ends). A flexible lead wire was then spliced to the end of each stator coil magnet wire extension by first cutting the coil magnet wire to length and having the insulation stripped off the wire. A first piece of sleeving was then slipped over the stripped coil magnet wire of the winding extension and a second piece of sleeving, larger in diameter than the first piece of sleeving, was slipped over the first piece of sleeving used to cover the exposed portion of the winding extension. The stripped end of the magnet wire and the stripped portion of a flexible wire were then inserted into a splice connector and placed in the jaws of a compression tool which crimped the connector and wires together. Next, the sleeving was moved over the splice and secured with a nylon tie. The leader wire splice connections were then tied to the stator end turns. Finally, the nylon tie was removed after the splice was secured.

Conventional methods of terminating stator wires frequently required a person to expend a significant amount of time identifying various winding extensions on the stator and properly working with them during assembly of the various connections. These prior methods required such materials as insulation sleeving, magnet wire, stripping tools, compression tools for each size splice, nylon ties, etcetera. Such conventional prior art methods were labor intensive and required a craftsman's level of skill.

Recently, newer methods have been disclosed whereby stator coil magnet wires are run to a terminal housing unit which accepts incoming stator coil magnet wires and provides a connection point for outgoing flexible lead wires. Such a terminal housing is shown in U.S. Pat. No. 4,177,397 which discloses a terminal housing that is mounted on a motor stator and has wire-emitting slots which accept stator coil magnet wires directly without the need for flexible wire leads. The terminal housing unit, as disclosed in that patent, also accepts a terminal attached to a lead wire which completes the connection between the stator wire to the lead wire. U.S. Pat. No. 4,656,378 also discloses a stator terminal housing unit which provides solderless connections from the stator winding wires to lead wires which extend from the terminal housing unit. These terminating schemes lack fully desirable components which ensure that proper connections will be made with the terminal housing unit. In addition, these terminating schemes fail to ensure that the structural integrity of the connection will be maintained.

It is desirable to provide an improved stator assembly which includes components for ease of assembly and for maintaining the structural integrity of electrical connections.

SUMMARY OF THE INVENTION

According to one aspect of the present invention there is provided a preferred stator termination assembly for mounting on a stator laminator assembly having a central rotor bore extending therethrough and stator coils wound therein. The preferred stator termination assembly comprises a gate member having an arcuate configuration constructed in such a way as to circumscribe at least a portion of the central rotor bore. The gate member also includes an arrangement for leading stator magnet wire extensions in spaced relation to one another, from the stator lamination assembly. In a preferred embodiment, the arrangement for leading a plurality of stator magnet wire extensions from the stator lamination assembly comprises a plurality of spaced channels. Preferably, each of the spaced channels has an arcuate configuration with an open end, each end being radially-spaced from another end along the arcuate configuration.

The stator gate member also has a retaining structure oriented to collect and retain magnet wire extensions. In a preferred embodiment, the retaining structure includes a hooking arrangement which is oriented to accept and hold a plurality of stator coil magnet wire extensions that have been led from the spaced channels.

The preferred stator termination assembly has an arcuate mounting portion and an inner wall with an inner surface that defines a circular arch of at least about 200°. The arcuate mounting portion also has an outer surface including a plurality of channels which are defined by an outer surface and a plurality of arcuate channel walls.

The mounting portion preferably includes two arcuate end points which are equidistant from a center arcuate point located on the inner surface of the arcuate mounting portion inner wall. The arcuate mounting portion further includes a mounting bracket, positioned at the center arcuate point. This mounting bracket can interlock around a stator winding so that the gate member is anchored to the stator lamination assembly.

The arcuate mounting portion can further include two end points, two snap tangs and two handle portions. The end points are preferably equidistant from the center arcuate point which is located on the inner surface of the arcuate mounting portion. The two snap tangs are also preferably located equidistant from each other with respect to the center arcuate point. Preferably the two snap tangs are radially-spaced about 200° from one another. The snap tangs are constructed so that each can lock around a stator winding so that the gate member is further anchored onto the stator lamination assembly. Two handle portions are also preferably located on the mounting bracket extending from each of the end points. These handles allow the gate member to be readily attached or removed from the stator lamination assembly.

The stator termination assembly preferably includes a terminator which attaches to the gate member and accepts stator magnet wire extensions from the gate member's retaining structure.

According to the present invention a method is provided for terminating generator stators. The method generally comprises the steps of providing a stator lamination assembly having a central rotor bore extending therethrough and a plurality of stator coils wound therein, and providing a stator gate member which has an arcuate mounting portion which circumscribes at least a portion of the central rotor bore, and an arrangement for leading a plurality of stator magnet wire extensions from the stator lamination assembly. The method then involves mounting the gate member to the stator lamination assembly. The method steps include guiding the stator magnet wire extensions from the stator lamination assembly through the arrangement for leading a plurality of stator magnet wire extensions and then hooking the stator magnet wire extensions into the retaining structure. The method may also include providing a terminator which can be mounted to the stator lamination assembly so that stator magnet wire extensions may be guided from the retaining structure to the terminator.

Once the wire extensions are positioned in the terminator, terminals such as MAG-MATE ® terminals are then loaded into the terminator. A terminator cover may then be positioned atop the terminator and locked into place. Electrical plug assemblies may then be inserted into the terminator cover.

BRIEF DESCRIPTION OF THE DRAWINGS

FIG. 2 is a side perspective view of the stator lamination assembly and stator termination assembly depicted in FIG. 1.

FIG. 3 is a front elevational view of the assemblies shown in FIGS. 1 and 2 depicted without wire coils thereon.

FIG. 8 is a top planar view of the retainer portion of the stator gate member according to the present invention.

FIG. 18 being taken toward a bottom side of the terminator cover.

DETAILED DESCRIPTION OF THE INVENTION

With respect to the present invention described in detail hereinbelow, attention will first be directed to the gross features of the overall stator termination assembly. Thereafter, each specific component of the present invention will be detailed in the order in which that component is assembled to the stator.

OVERALL STATOR TERMINATION ASSEMBLY—CROSS FEATURES

Figure 1:
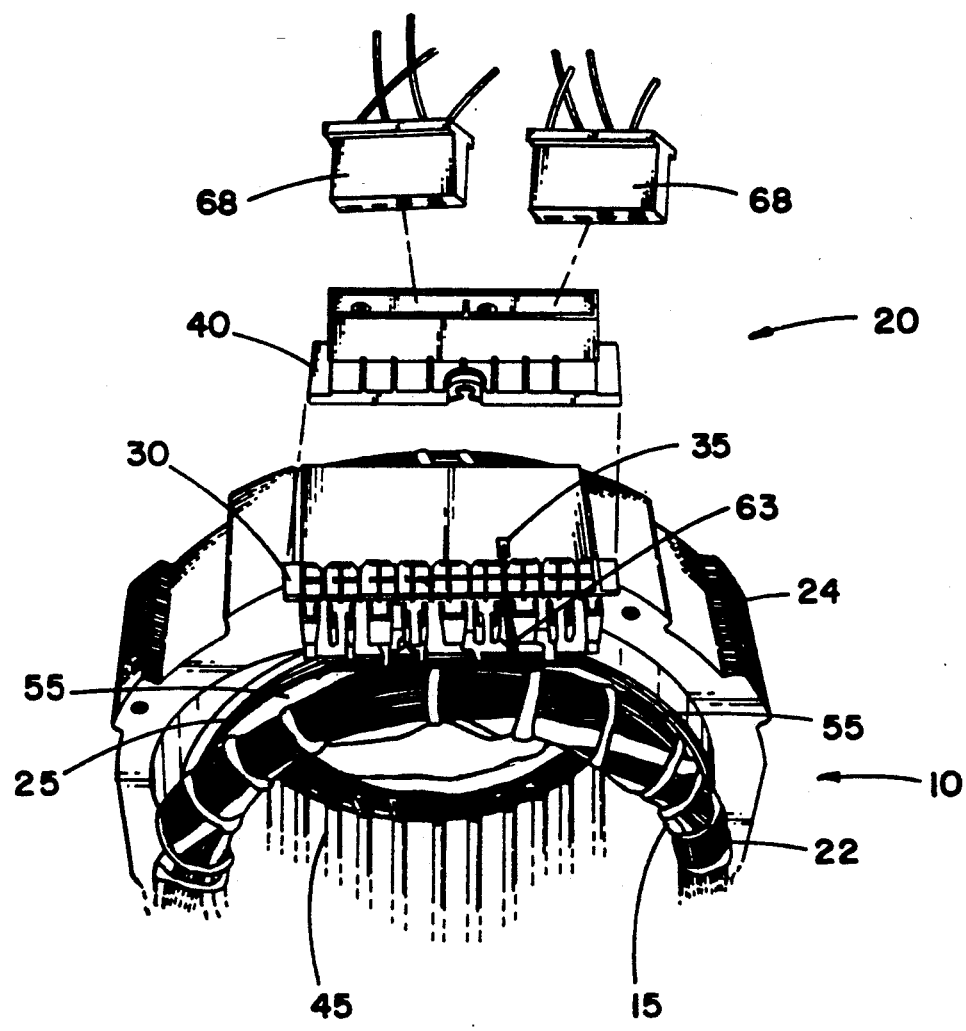
FIG. 1 is a fragmentary, exploded perspective view of a stator lamination assembly having a stator termination assembly according to the present invention thereon.

Referring to FIGS. 1-6 the basic components of the present invention will be appreciated. FIG. 1 is an exploded front view of a generator stator assembly 10 having a central rotor bore 15, a stator termination assembly 20, stator winding wires or stator coils 22 (having an insulated coating 23 not shown) and a stator lamination assembly 24. The stator lamination assembly 24 has central bore 15 extending therethrough and stator coils 22 wound therein. Stator termination assembly 20 comprises gate member 25, stator terminator 30, solderless terminals 35 and a stator terminator cover 40. FIG. 2 is a side perspective illustrating how stator termination assembly 20 engages stator lamination assembly 24.

The stator termination assembly 20 is shown in a front elevational view in FIG. 3, positioned atop a stator lamination 43 having a central rotor bore 15, a plurality of slot liners 45, and a plurality of slot wedges 50 which are positioned within the plurality of slot liners 45 (in FIG. 3 only some of slot liners 45 are shown with slot wedges 50). The plurality of slot liners 45 insulate the stator winding wires 22 from the lamination assembly 24 as shown in FIG. 1.

Figure 4:
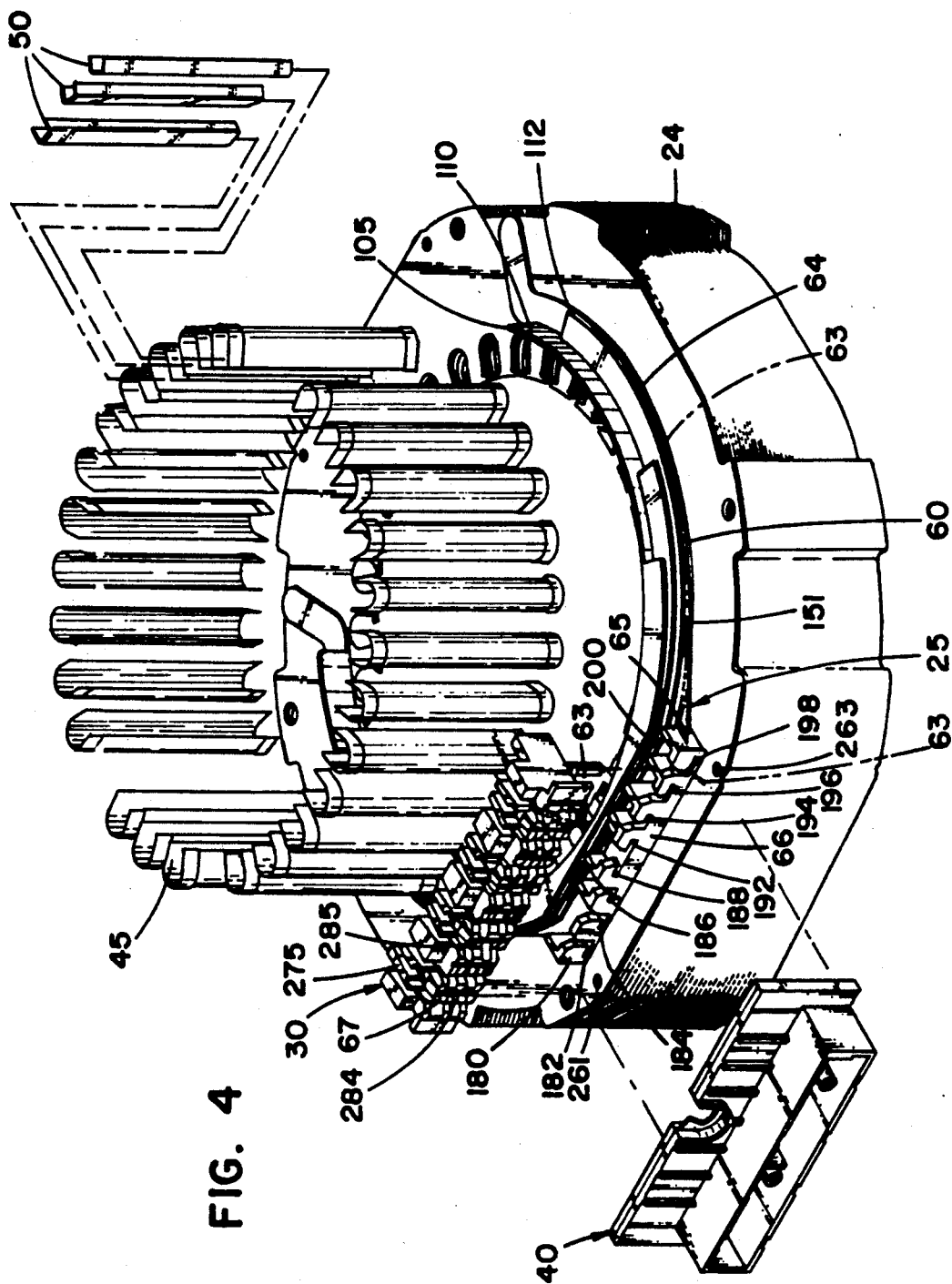
FIG. 4 is an exploded side perspective view of stator lamination and termination assemblies according to the present invention depicted without wire coils.
Figure 5:
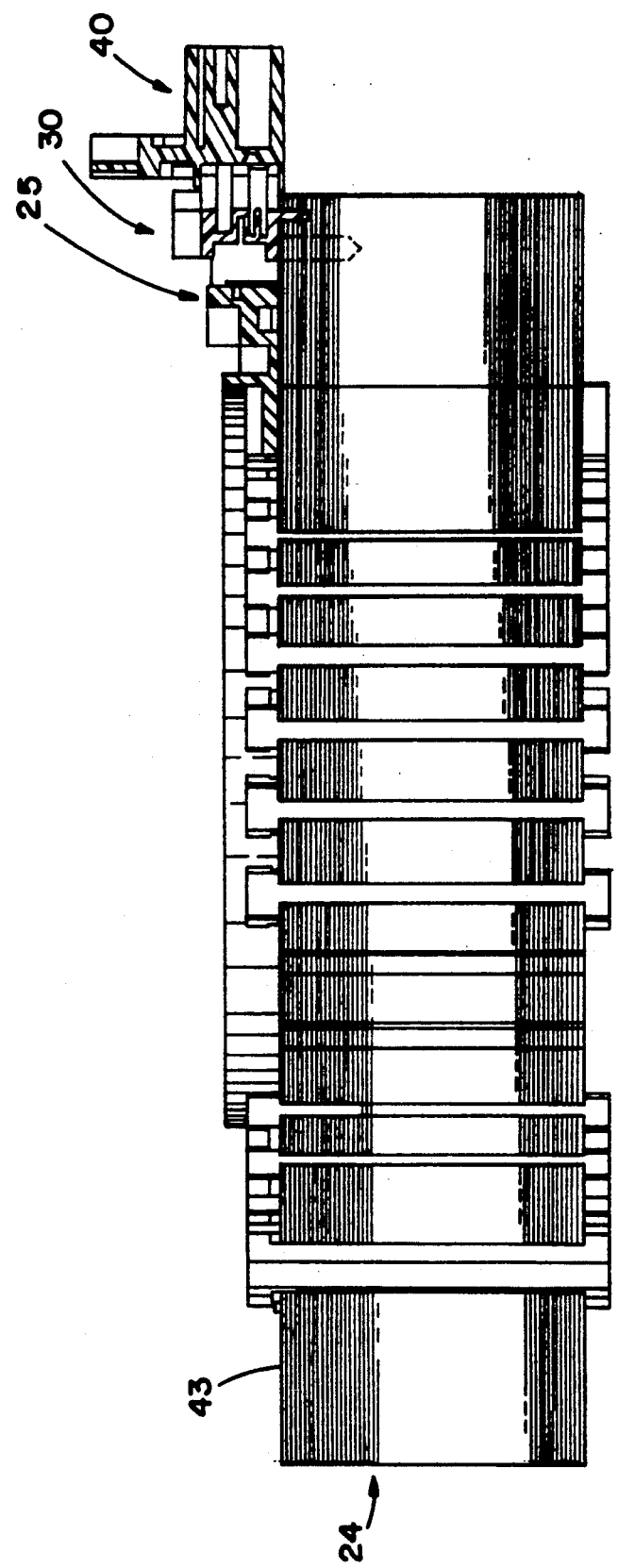
FIG. 5 is a cross-sectional view of the stator lamination assembly and stator termination assembly taken generally along line 5—5, FIG. 3.

FIG. 4 shows an exploded perspective view of stator termination assembly 20, stator lamination assembly 24 having central bore 15 extending therethrough, plurality of slot liners 45, and plurality of slot wedges 50. FIG. 5 is a cross-sectional view taken along line 5—5 of the assembly shown in FIG. 3. FIG. 5 shows stator termination assembly 20 positioned atop stator lamination assembly 24. FIG. 5 also shows cross-sectional views of gate member 25, terminator 30 and terminator cover 40.

Figure 6:
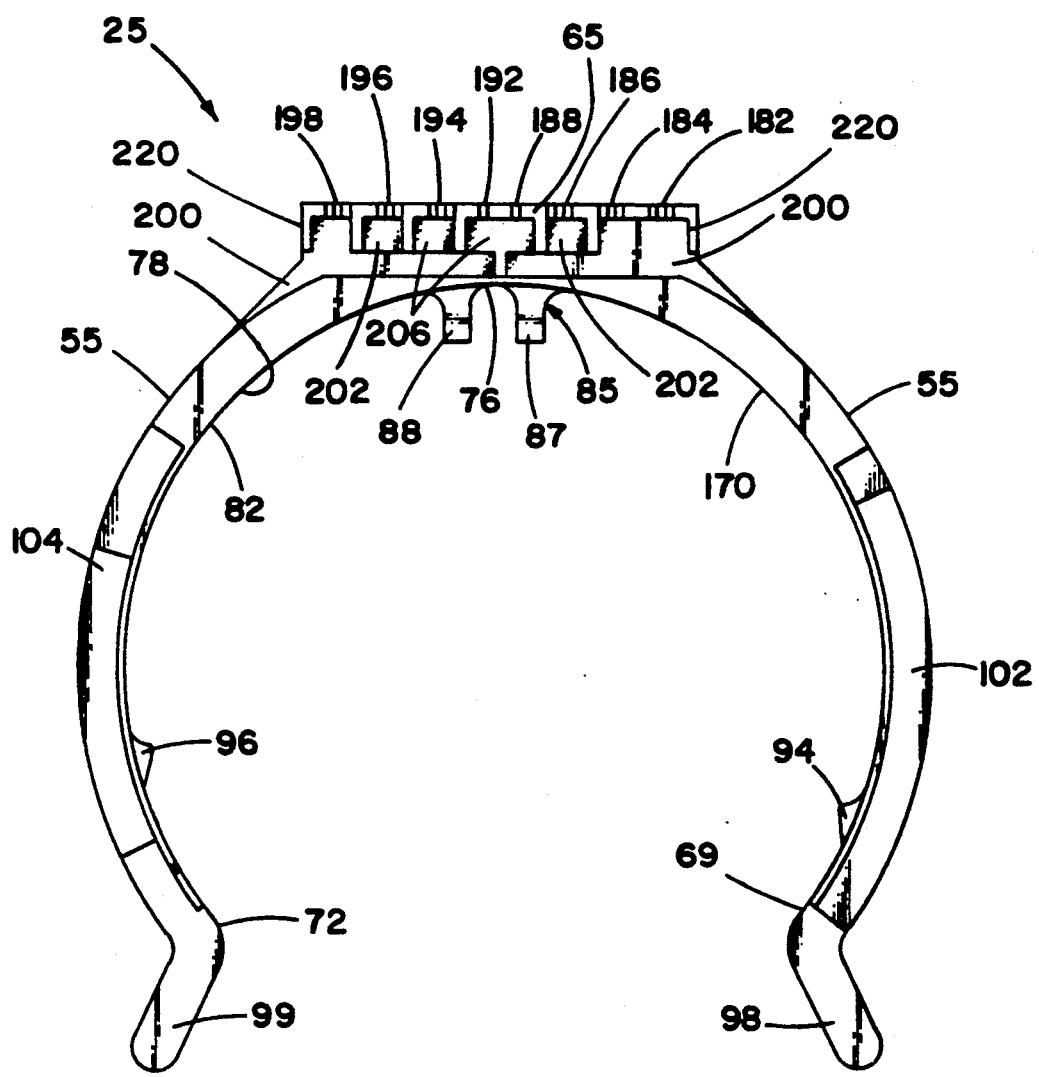
FIG. 6 is a front elevational view of a stator gate member according to the present invention.

Gate member 25, FIG. 6, has a mounting portion 55, preferably with an arcuate configuration which is constructed and arranged to circumscribe at least a portion of central rotor bore 15. Gate member 25 includes an arrangement 60, FIGS. 2 and 4, for leading a plurality of stator magnet wire extensions 63 in spaced relation from the stator windings 22. As seen in FIG. 2, arrangement 60 comprises a plurality of channels 64, preferably having an arcuate configuration. Gate member 25 also includes a retaining structure 65, as shown in FIG. 4, oriented to collect and retain the plurality of stator magnet wire extensions 63, in spaced relation to one another, from plurality of channels 64. The stator coil magnet wire extensions 63 are then terminated with terminals 35, FIG. 1, and excess magnet wire is then cut off. The terminator cover 40 is then placed over terminator 30 to secure terminals 35 into position. As shown in FIG. 4, preferably retaining structure 65 comprises a hooking arrangement 66 for selectively securing stator coil magnet wire extensions 63 after they have been lead through plurality of channels 64. With the general components of the present invention outlined above as background, a brief description of the assembly and operation of the present invention is now provided hereinbelow.

As seen in FIG. 1, gate member 25 snaps around stator lamination assembly 24 so that stator magnet wire extensions 63, FIG. 2, (there are three extensions 63 on each side of gate member 25) can be led from stator lamination assembly 24 through arrangement 60 to retaining structure 65 (seen in FIG. 4). Gate member 25 preferably comprises an insulator material which electrically insulates stator coil magnet wire extensions 63 from other magnet wire extensions 63 of differing electric potentials. This material may comprise nylon which has good structural memory yet remains flexible so that gate member 25 is capable of snapping in position around stator lamination assembly 24, as shown in FIG. 1. Gate member 25 is constructed to advantage such that stator wires 22 can be led from the point they exit stator lamination assembly 24 as magnet wire extensions 63, FIG. 2. Stator coil magnet wire extensions 63 are then hooked into retaining structure 65 (FIG. 4). Stator terminator 30 is selectively positioned over gate member 25 so that stator magnet wire extensions 63 can be led to a terminal receiving surface 67, FIG. 4. Terminals 35 are then loaded onto terminator 30 to produce an electrical connection between terminals 35 and stator magnet wire extensions 63 which extend from stator coil magnet wires 22, FIG. 1. Stator terminator cover 40 is then attached to stator terminator 30 so that the terminals 35 are properly oriented and anchored into stator terminator 30. Electrical assembly plugs 68 are then inserted into stator terminator cover 40 so that an electrical connection is made from stator wires 22 to electrical plug assembly 68, FIG. 1.

As will be seen from descriptions concerning other figures hereinbelow, the stator termination assembly 20 results in an advantageous construction. The present invention concerns an improved construction which results in a more efficient and effective manner of terminating stator coil magnet wires. Features concerning this, and other advantageous characteristics of the stator termination assembly 20 will be understood from detailed description of various components discussed hereinbelow.

THE STATOR GATE MEMBER

FIGS. 6-10 illustrate gate member 25 which is capable of leading stator magnet wire extensions 63 from stator lamination assembly 24 to stator terminator 30. It will be appreciated that gate member 25 with its channels 64 and hooking arrangements 66 improves efficiency of assembly of stator 10.

FIG. 6 illustrates a front elevational view of gate member 25 having mounting portion 55 and retaining structure 65. The preferred mounting portion 55 has a first end point 69 and a second end point 72 which are preferably equidistant from a center point 76. End points 69, 72 and center point 76 are located on a curved inner wall 78 having an inner surface 82. In a preferred arcuate configuration, as shown in FIG. 6, endpoints 69 and 72 are each at least about 100° and no more than 150° radially-spaced from center point 76, preferably about 100° to 135°, and most preferably about 100°. Endpoints 69 and 72 are radially-spaced the same distance from center point 76 along the inner surface 82 for ease of assembly. The endpoints 69 and 72 must be radially-spaced greater than 90° from center point 76 so that the gate member 25 will properly attach or "snap" into position around slot liners 45 of stator lamination assembly 24.

A mounting bracket 85 is located at center point 76 and is constructed as a yoke to provide interlocking with one of stator windings 22, so that stator gate member 25 is anchored to stator lamination assembly 24. Preferably, mounting bracket 85 comprises first and second locating teeth, 87 and 88 respectively, as shown in FIG. 6. Locating teeth 87 and 88 permit mounting bracket 85 to lock around a slot liner 92 of the first plurality of slot liners 45, as shown in FIG. 3.

In addition to mounting bracket 85, mounting portion 55, FIG. 6, has a first snap tang 94 and a second snap tang 96. Snap tangs 94 and 96 are also located on inner surface 82. Snap tangs 94 and 96 are preferably approximately equidistant from each other with respect to center point 76 and are constructed for locking around selected stator winding wires 22 so that stator gate member 25 is anchored to stator lamination assembly 24. This is facilitated by the "hook"-shaped tangs 94 and 96 allowing them to wrap around associated liners 45, FIG. 3. Snap tangs 94 and 96 are located at least 100° from center point 76 (FIG. 6) to prevent gate member 25 from being removed from the associated liners 45 when the gate member 25 is in its unflexed orientation. In other words, snap tangs 94 and 96 are preferably equidistant from each other with respect to center point 76 and at least about 200° radially-spaced from one another.

Figure 7:
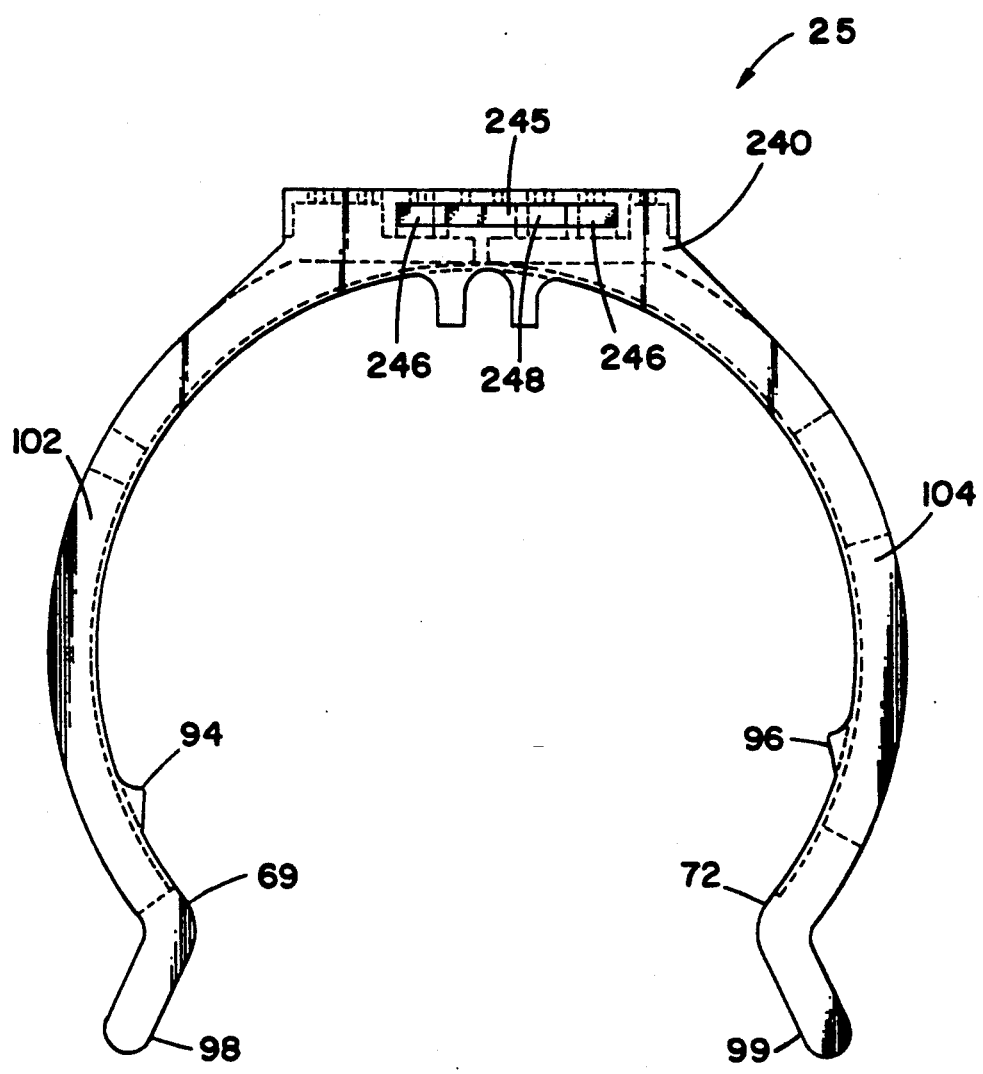
FIG. 7 is a rear elevational view of the stator gate member depicted in FIG. 6.

Mounting portion 55 further includes a first handle portion 98 and a second handle portion 99 which are positioned in extension outwardly from first end point 69 and second end point 72, respectively, as shown in FIGS. 6 and 7. Again, preferably mounting portion 55 is provided with sufficient structural memory and flexibility such that handle portions 98 and 99 can be biased (spread or twisted) away from each other so that gate member 25 can either be manually placed around or removed from stator lamination assembly 24.

Referring to FIGS. 6 and 7, mounting portion 55 has a yoke configuration which comprises a first leg portion 102 and a second leg portion 104 which enables gate member 25 to circumscribe at least a portion of central rotor bore 15, FIG. 3. First leg portion 102 includes first locating tooth 87, first snap tang 94, and first handle portion 98. Second leg portion 104 includes second locating tooth 88, second snap tang 96, and second handle portion 99. Preferably leg portions 102 and 104 are arcuate, as shown in FIGS. 6 and 7.

Figure 10:
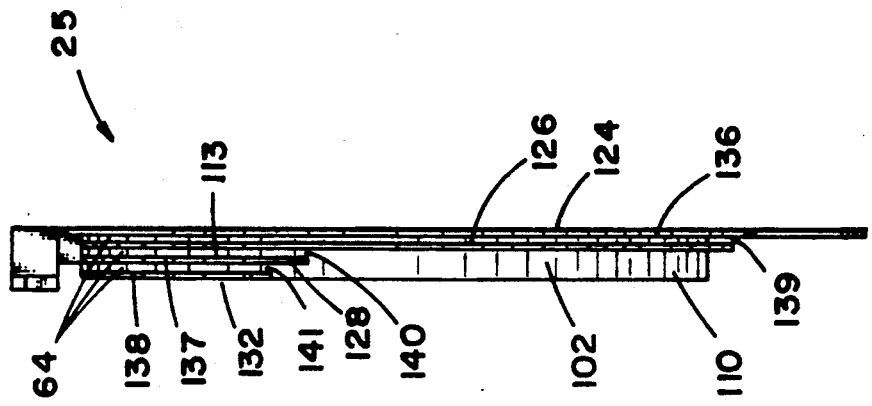
FIG. 10 is a side elevational view of stator gate member shown in FIG. 6, FIG. 10 being a side view opposite to that shown in FIG. 9.
Figure 9:
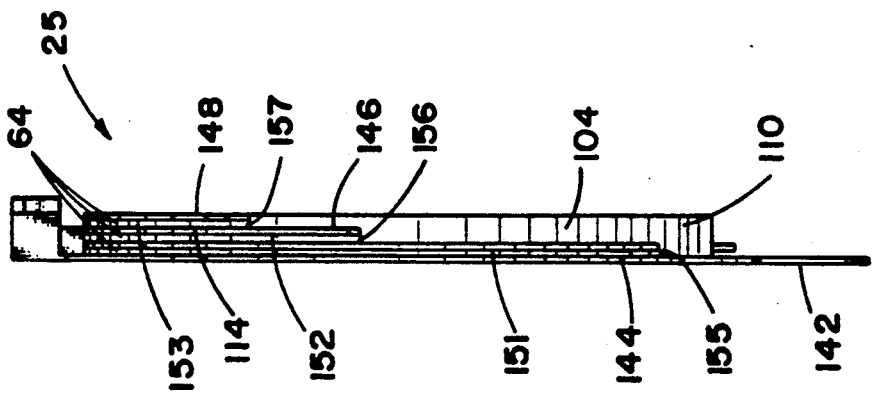
FIG. 9 is a side elevational view of the stator gate member shown in FIG. 6.

In the preferred embodiment described and shown in FIG. 4, arrangement 60 for leading a plurality of stator magnet wire extensions 63 comprises an outer wall 105 having an outer surface 110 with a plurality of channel walls 112 positioned on, and attached substantially perpendicular to, outer surface 110, FIG. 4. Outer surface 110 and plurality of channels walls 112 define plurality of channels 64 as shown in FIG. 4. Plurality of channels 64 comprises a first three-channel grouping 113 located on an outer surface 110 of first leg portion 102, as seen in FIG. 10. Plurality of channels 64 further comprises a second three-channel grouping 114 located on outer surface 110 of second leg portion 104, as seen in FIG. 9. Channel groupings 113 and 114 accept ends or leads of battery, quadrature and power winding wires (stator magnet wire extensions 63) at the point at which they terminate from stator 10 and insulate these stator magnet wire extensions 63 from one another. It is appreciated that the number of channels per grouping 113 or 114 may be varied to accommodate the number of stator magnet wire extensions 63 terminating from stator lamination assembly 24.

FIG. 10 illustrates a side elevational view of first leg portion 102. In particular, FIG. 10 illustrates the first three-channel grouping 113. Three-channel grouping 113 comprises: lower channel wall 124; a first inner channel wall 126 spaced from, and extending generally parallel to wall 124; a second inner channel wall 128 spaced from, and extending generally parallel to walls 124 and 126; an upper channel wall 132 spaced from, and extending generally parallel to walls 124, 126 and 128; and, outer surface 110 from which walls 124, 126, 128 and 132 project. Lower channel wall 124, first inner channel wall 126, and outer surface 110 define a first channel 136. First inner channel wall 126, second inner channel wall 128, and outer surface 110 define a second channel 137. Second inner channel wall 128, upper channel wall 132, and outer surface 110 define a third channel 138. As illustrated in FIG. 10, first channel 136 has the longest length of channels 136, 137 and 138, its open end or entrance opening being at 139, FIG. 9. Second channel 137 is longer in length than third channel 138, the open ends or entrance openings of channels 137 and 138 being at 140 and 141 respectively, FIG. 10.

FIG. 9 illustrates a side elevational view of the second three channel grouping 114 of second leg portion 104. Second three-channel grouping 114 comprises: lower channel wall 142; a first interior channel wall 144 spaced from, and extending generally parallel to wall 142; a second interior channel wall 146 spaced from, and extending generally parallel to walls 142 and 144; an upper channel wall 148 spaced from, and extending generally parallel to, walls 142, 144 and 146; and, outer surface 110 from which walls 142, 144, 146 and 148 project. Lower channel wall 142, first interior channel wall 144, and outer surface 110 define an inner channel 151. First interior channel wall 144, second interior channel wall 146, and outer surface 110 define a middle channel 152. Second interior channel wall 146, upper channel wall 148, and outer surface 110 define outer channel 153. As illustrated in FIG. 9, inner channel 151 has the longest length of channels 151, 152 and 153, its open end or entrance opening being at 155, FIG. 9. Middle channel 152 is longer in length than outer channel 153, the open end or entrance openings of channels 152 and 153 being at 156 and 157, respectively, FIG. 9.

Preferably, first channel 136 is longer than inner channel 151; middle channel 152 is longer than second channel 137; and third channel 138 has a similar length as outer channel 153. Such a configuration of channel lengths allows various stator coil magnet wire extensions 63 to be conveniently led to a specific channel from stator lamination assembly 24. It also facilitates identification of different wires. Open ends 139, 140, 141, 155, 156 and 157 are located at specific points along groups 113 and 114 so that channels 136, 137, 138, 151, 152 and 153 are capable of accepting specific stator magnet wires (i.e., quadrature, battery and power winding wires) at the point where the coil magnet wires terminate (stator magnet wire extensions 63) and exit from their stator slots 45 of stator lamination assembly 24.

In a preferred embodiment, mounting portion 55 and plurality of channels 64 have an arcuate configuration such that gate member 25 circumscribes a portion of central rotor bore 15, as shown in FIGS. 1 and 3. In this preferred embodiment, mounting portion 55 has an inner surface wall 78 having an inner surface 82 which defines a circular arch 170 which is between about 200° to 270°, FIG. 6. In this preferred embodiment, channel walls 124, 126, 128, 132, 142, 144, 146 and 148, along with outer surface 110, have an arcuate and circular configuration and define channels 136, 137, 138, 151, 152 and 153. Open ends or entrance openings 139, 140, 141, 155, 156 and 157 are radially-spaced along the arcuate configuration to advantage. The arcuate configuration facilitates the mounting of gate member 25 to stator lamination assembly 24. Radially-spaced entrance openings 139, 140, 141, 155, 156 and 157 are positioned so that they may accept stator coil magnet wire extensions 63 which terminate from stator lamination assembly 24, as seen in FIG. 2. The arcuate configuration of plurality of channels 64 expedites the leading of stator magnet wire extensions 63 from lamination assembly 24 to retaining structure 65.

Attention is now directed to retaining structure 65 which is shown in FIGS. 4 and 8. Retaining structure 65 is capable of retaining a plurality of stator magnet wire extensions 63 which have been guided through plurality of channels 64 from stator lamination assembly 24 to terminator 30. In the preferred embodiment, retaining structure 65 comprises hooking arrangement 66. After the stator magnet wire extensions 63 are led through channels 64, the magnet wire extensions 63 are hooked into, and retained by, hooking arrangement 66 to advantage, as seen in FIG. 4. Hooking arrangement 66 permits magnet wire extensions 63 to be retained in place while stator terminator 30 is anchored to gate member 25 and stator lamination assembly 24.

In a preferred embodiment, hooking arrangement 66 comprises a retaining wall 180 having at least 2 hooking apertures 181. In most preferred embodiment retaining wall 180 comprises eight bites or hooking apertures, 182, 184, 186, 188, 192, 194, 196, and 198, FIGS. 4, 6 and 8. As seen in FIGS. 4 and 8, bites 192, 194, 196, and 198 have an L-shaped configuration. Bites 182, 184, 186, and 188 have a reverse L-shaped configuration, as seen in FIGS. 4 and 8. Stator magnet wire extensions 63 can been led through plurality of channels 64 and hooked and retained by bites 182, 184, 186, 188, 192, 194, 196, and 198. Stator magnet wire extensions 63 are retained in the bites of hooking arrangement 64 during the anchoring of stator terminator 30 to gate member 25 and stator lamination assembly 24.

In this most preferred embodiment, as seen in FIG. 6, hooking arrangement 66 is further defined by gate surfaces 200 (inner surface of walls 124 and 142), 202, and 206. Center gate surface 200 is oriented so that bites 182, 184 can readily accept stator magnet wire extensions 63 from channel 136 and so that bite 198 can readily accept stator magnet wire extensions 63 from channel 151.

First elevated gate surface 202 is oriented so that bites 186 and 196 can readily accept stator coil magnet wire extensions 63 from channels 137 and 152 respectively. Second elevated gate surface 206 is oriented so that bites 192, 194 can readily accept stator magnet wire extensions 63 from channel 153 and bite 188 can readily accept stator coil magnet wire extensions 63 from channel 138. FIG. 4 illustrates an example of how a stator magnet wire extension 63 is led through channel 151, across center gate surface 200 and led through and hooked into bite 198.

Preferably, as seen in FIG. 6, retaining structure 65 further comprises a plurality of support walls 220 which are substantially perpendicular to retaining wall 180 (FIG. 4) and protrude from surfaces 200, 202, and 206. Support walls 220 help provide structural strength to retaining structure 65 and help ensure that stator magnet wire extensions 63 are led to a specific bite.

Referring to FIG. 7, in a preferred embodiment, an undersurface area 240 of gate member 25 comprises an indentation area 245. Indentation area 245 comprises a first indentation surface 246, and a second indentation surface 248. First indentation surface 246 is the reverse side of first elevated center gate surface 202. Second indentation surface 248 is the reverse side of second elevated center gate surface 208. Second indentation surface 248 preferably has an indentation depth which is deeper than that of first indentation 246 and second indentation 247.

STATOR TERMINATOR

Attention is now directed to FIG. 10 which depicts a top planar view of stator terminator 30 which is capable of being positioned atop and overlapping gate member 25 and attached to stator lamination assembly or shown in FIG. 4. Stator terminator 30 is capable of accepting stator magnet wire extensions 63. It is appreciated that stator terminator 30 provides a terminal receiving surface 67, wherein stator coil magnet wire extensions 63, led from retaining structure 65, can interface with terminals 35 to create an electrical connection. Various advantageous features of stator terminator 30 will be discussed hereinbelow.

Figure 11:
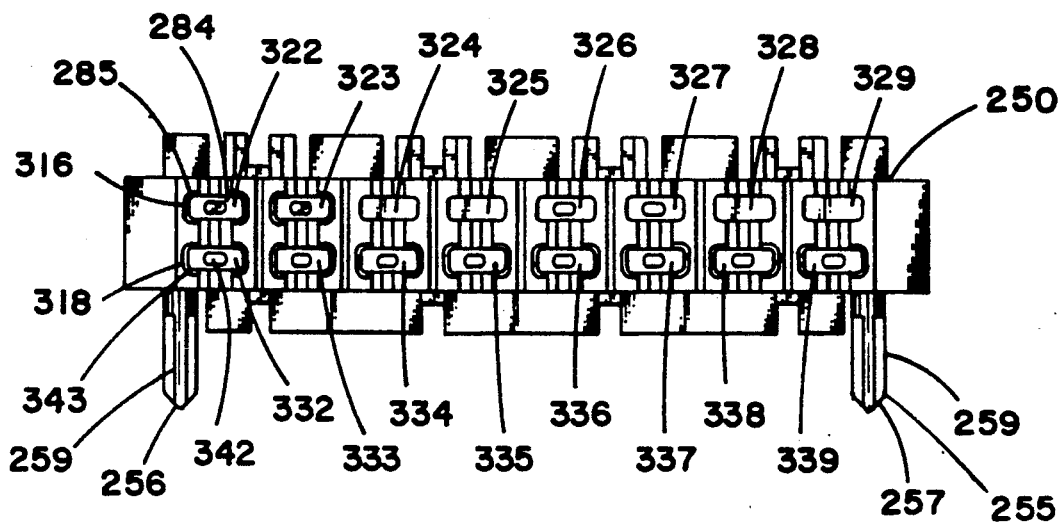
FIG. 11 is a top planar view of a stator terminator useable with a stator gate member according to the present invention.
Figure 12:
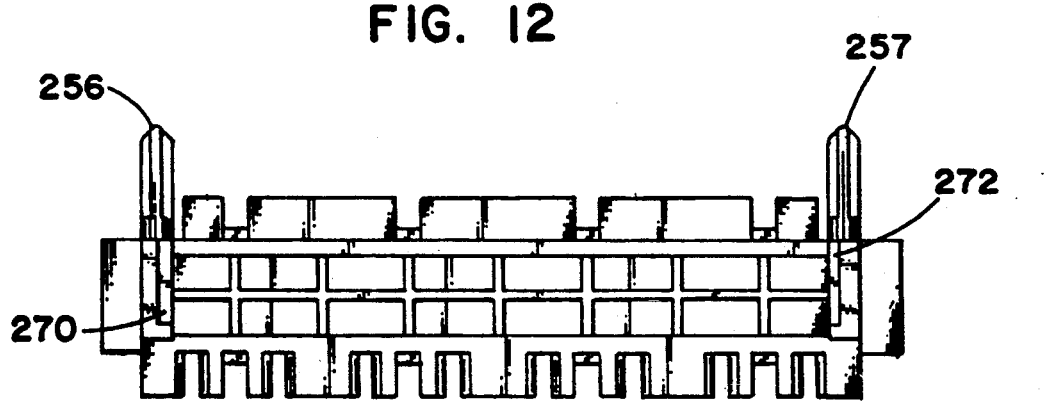
FIG. 12 is a bottom planar view of the stator terminator shown in FIG. 11.

Stator terminator 30 comprises body portion 250, and an anchoring arrangement 255, FIG. 11. Anchoring arrangement 255 comprises first leg portion 256 and second leg portion 257, FIGS. 11 and 12. Leg portions 256 and 257 operate to anchor stator terminator 30 to stator lamination assembly 24 so that stator terminator is positioned to accept stator coil magnet wire extensions 63 from retaining structure 65. In the preferred embodiment shown in FIGS. 11 and 12, first leg portion 256 and second leg portion 257 each have a generally identical cylindrical shape with fluted edge 259. Leg portions 256 and 257 are inserted into first aperture 261 and second aperture 263 respectively of stator lamination assembly 24 as stator terminator 30 overlaps gate member 25 as shown in FIG. 4.

Body portion 250 of stator terminator 30 further includes receiving slots 270 and 272, FIG. 11, which enables the terminator 30 to be assembled atop gate member 25 such that terminal receiving surface 67 is in advantageous proximity to retaining structure 65.

As shown in FIG. 4, stator terminator 30 has a guiding channel arrangement 275 and terminal receiving surface 67 which contains terminal accepting structure 284 preferably comprised of a plurality of terminal pockets 285. Once the stator terminator is attached to stator lamination assembly 24, guiding channel arrangement 275 can lead stator magnet wire extensions 63 from retaining structure 65 to terminal accepting surface 67, as shown in FIG. 4. Stator magnet wire extensions 63 can then be led into terminal accepting structure 284, and in a preferred embodiment, into terminal pockets 285, FIG. 11. Terminals 35 can then be loaded into terminal accepting structure 284, as shown in FIG. 1, such that terminals 35 cut into insulation 23 of stator coil magnet wire extensions 63 resulting in an electrical connection therein. Terminal accepting structure 284 provides an optimal configuration so that an electrical connection can be made between stator coil magnet wire extensions 63 and terminals 35. Preferred constructions can be made to accommodate consequently available terminals 35, such as MAG-MATE® terminals available from AMP Corporation.

Figure 14:
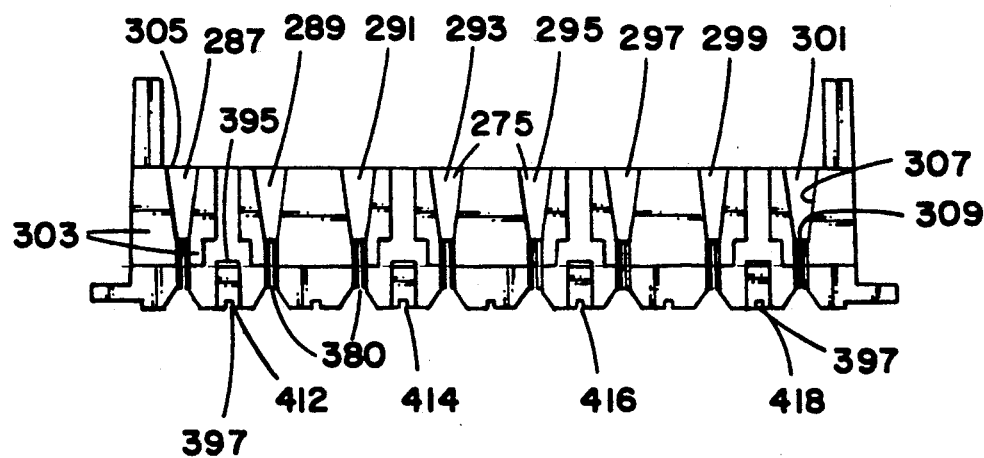
FIG. 14 is a front elevational view of the stator terminator shown in FIG. 11.

In a preferred embodiment, as seen in FIGS. 4 and 14, stator terminator 30 has guiding channel arrangement 275 which helps guide stator coil magnet wire extensions 63 from retaining structure 65 to terminal accepting structure 284 of stator terminator 30. As seen in FIG. 14, guiding channel arrangement 275 comprises a first winding extension guide 287, a second winding extension guide 289, a third winding extension guide 291, a fourth winding extension guide 293, a fifth winding extension guide 295, a sixth winding extension guide 297, a seventh winding extension guide 299, and an eighth winding extension guide 301.

As seen in FIG. 14, guiding channel arrangement 275 is defined by adjacent walls 303 and extension guide surface 305. Extension guide channels 285 each have a funnel configuration with a wide mouth portion 307 in close proximity to retaining structure 65, and a narrow neck portion 309 in close proximity to terminal accepting structure 284. This funneled configuration allows the stator wire to be easily guided from retaining structure 65 of gate member 25 to terminal accepting structure 284 of stator terminator 30.

In a preferred embodiment, as seen in FIG. 11, a plurality of pockets 285 comprises a first row of terminal pockets 316 and a second row of terminal pockets 318. First row of terminal pockets 316 includes eight pockets, namely first upper pocket 322, second upper pocket 323, third upper pocket 324, fourth upper pocket 325, fifth upper pocket 326, sixth upper pocket 327, seventh upper pocket 328, and eighth upper pocket 329. Second row of terminal pockets 318 also includes eight pockets, namely first lower pocket 332, second lower pocket 333, third lower pocket 334, fourth lower pocket 335, fifth lower pocket 336, sixth lower pocket 337, seventh lower pocket 338, and eighth lower pocket 339.

Figure 15:
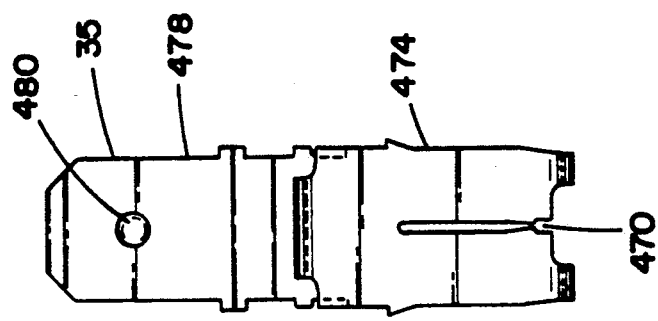
FIG. 15 is a front elevational view of a MAG-MATE ® terminal useable with a stator gate member according to the present invention.

Pockets 285 may also have a projecting portion 342 protruding from an inner pocket surface 343. Projecting portion 342 is operable of engagement with an insulation piercing terminal 35 as shown in FIG. 15. After stator magnet wire extensions 63 have been led to terminal pockets 285, terminals 35 are loaded and trap magnet wire extensions 63 between terminals 35 and projecting portions 342. As terminals 35 engage projecting portions 342, the terminals 35 cut into the insulation 23 (not shown) around stator magnet wire extensions 63. This results in electrical connections between the stator magnet wire extensions 63 and the terminals 35. In a preferred embodiment, pockets 324, 325, 328 and 329 do not contain projection portion 342. When there are two or more rows of pockets 285 the insertion of terminals 35 will be electrically at the same potential because they will be connected to the same magnet wire extension 63.

Figure 13:
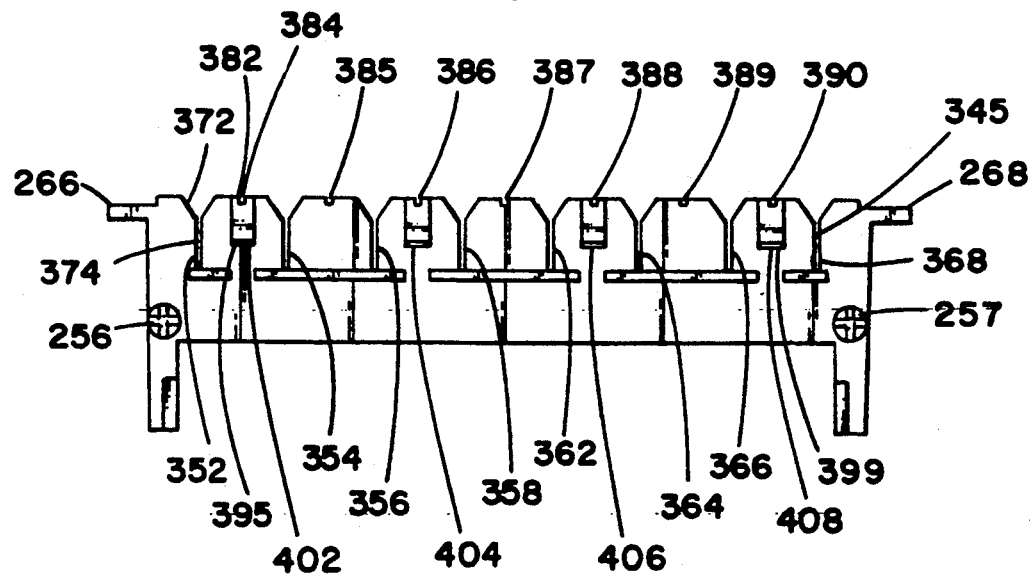
FIG. 13 is a rear elevational view of the stator terminator shown in FIG. 11.

Terminal receiving surface 67 (FIG. 4) further comprises a groove arrangement 345 (FIG. 13) which traverses terminal pockets 285 (FIG. 11) and operates to facilitate stator magnet wire extensions 63 being led from guiding channel arrangement 275 (FIG. 14) into the terminal pockets 285. As seen in FIG. 13, groove arrangement 345 comprises eight grooves 350, namely a first groove 352, a second groove 354, a third groove 356, a fourth groove 358, a fifth groove 362, a sixth groove 364, a seventh groove 366, and eighth groove 368.

Grooves 350 each have a wide funnel portion 372 and a narrow neck portion 374, FIG. 13. Wide funnel portion 372 allows stator magnet wire extensions 63 to be positioned over and led into groove arrangement 345. Once a stator magnet wire extension 63 is positioned over wide funnel portion 372, it can be guided through narrow neck portion 374 and secured. As seen in FIG. 14, termination points 380 anchor stator magnet extensions 63 into terminator 35 so that electrical connections can be made when MAG-MATE® terminals 35 are loaded therein.

Attention is now directed to FIG. 13 which illustrates an indentation arrangement 382 capable of engaging stator terminator cover 40 such that stator terminator cover 40 is further secured to stator terminator 30. Indentation arrangement 382 is advantageous to the construction of stator termination assembly 20 because it properly aligns terminator cover 40 onto stator terminator 30. Indentation arrangement 382 comprises, first indentation 384, second indentation 385, third indentation 386, fourth indentation 387, fifth indentation 388, sixth indentation 389, and seventh indentation 390.

Referring to FIGS. 13 and 14, stator terminator 30 preferably includes a locking tab arrangement 395 which operates to lock and orient stator terminator cover 40 onto stator terminator 30. Preferably, locking tab arrangement 395 comprises a plurality of front tabs 397 (FIG. 14) and a plurality of rear tabs 399 (FIG. 13). As seen in FIG. 13, rear tabs 399 comprise first outer tab 402, first middle tab 404, second middle tab 406, and second outer tab 408. As seen in FIG. 14, front tabs 397 comprise first exterior male locking tab 412, first interior male locking tab 414, second interior male locking tab 416, and a second exterior male locking tab 418.

Preferably, front and rear tabs 397 and 399 respectively have identical configurations which protrude gradually "outwardly" from surface 410 to a height of at least about 1.5 mm. As used herein, "outwardly" refers to protruding up from the sheet plane depicted in FIGS. 12 and 13. This configuration allows the terminator cover 40 to gradually slide over front and rear tabs 397 and 399 respectively until cover 40 locks into position over terminator 30.

MAG-MATE® SOLDERLESS TERMINALS

FIG. 14 is a front elevational view of a MAG-MATE® solderless terminal 35 which is designed according to U.S. Pat. No. 4,130,331. MAG-MATE® terminal 35 has a pocket engaging surface or profile edge 470 capable of engaging terminal pockets 285. MAG-MATE® terminal 35 further comprises a lower body portion 474 and an upper head portion 478. Upper head or blade portion 478 contains a MAG-MATE® terminal aperture 480 which operates to accept a lead wire or is capable of being connected to electrical plug assembly 68.

MAG-MATE® terminals 35 can be loaded into terminal pockets 285 and pierce the insulation 23 of a stator magnet wire extensions 63 contained therein. This results in an electrical connection between MAG-MATE® terminals 35 and stator magnet wire extensions 63.

STATOR TERMINATOR COVER

Figure 18:
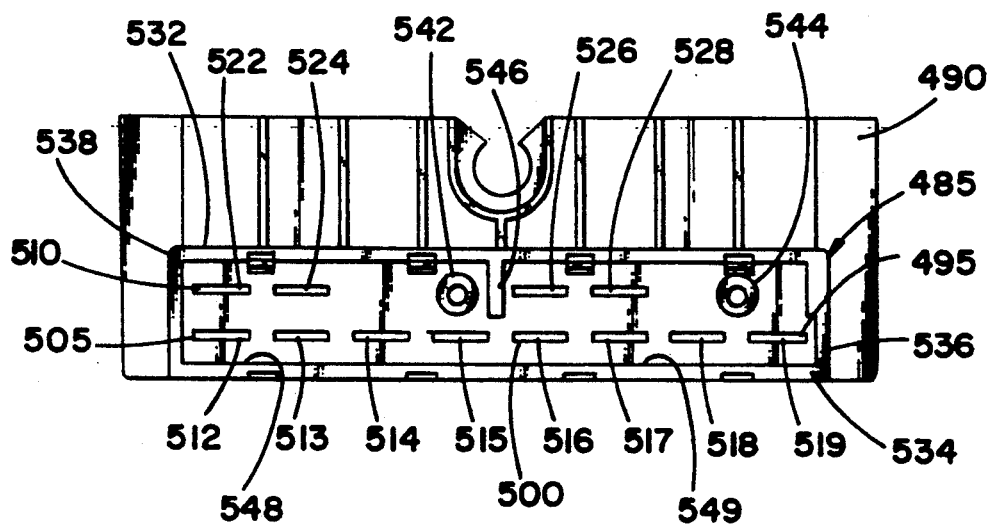
FIG. 18 is a top planar view of a stator terminator cover useable with a stator gate member according to the present invention.

FIG. 18 illustrates a top planar view of stator terminator cover 40. Stator terminator cover 40 aligns and secures terminals 35 which have been inserted in stator terminator 30. Stator terminator cover 40 includes a lead plug accepting structure 485 which is capable of only accepting specific electrical plug assembly 68. Such a configuration ensures that a proper connection is made between terminals 35 and electrical plug assembly 68.

Stator terminator cover 40 has an upper surface 490 containing a terminal receiving arrangement 495, FIG. 18. Terminal receiving arrangement 495 comprises a plurality of (blade) apertures 500, each capable of receiving the upper head portion 478 of terminals 35. Preferably, as seen in FIG. 18, plurality of apertures 500 comprises a lower row of apertures 505 and an upper row of apertures 510. As shown and oriented in FIG. 18, lower row of apertures 505 comprises a left outer aperture 512, a first middle aperture 513, a second middle aperture 514, a first inner aperture 515, a second inner aperture 516, a third middle aperture 517, a fourth middle aperture 518, and a right outer aperture 519. Upper row of apertures 510 comprises a left upper aperture 522, a left middle aperture 524, a right inner aperture 526, and a right middle aperture 528.

Preferably, plurality of apertures 500 have identical rectangular configuration having a length of at least about 0.25 mm greater than the blade portion 478 of the terminals 35. This configuration allows the blade portion 478 of the terminals 35 to enter through plurality of aperture 500 as stator terminator cover 40 is placed over stator terminator 30. As a result, terminals 35 are properly secured as blade portions 478 are aligned in apertures 500 and body portions 474 are locked into stator terminator 30. Once properly aligned and secured, terminals 35 can be attached to electrical plug assemblies 68. The electric plug assembly 68 can be attached and removed several times without electrical degradation or failure of the electrical contact surface captured between profile edge 470 of terminals 35 and magnet wire extension 63.

Figure 17:
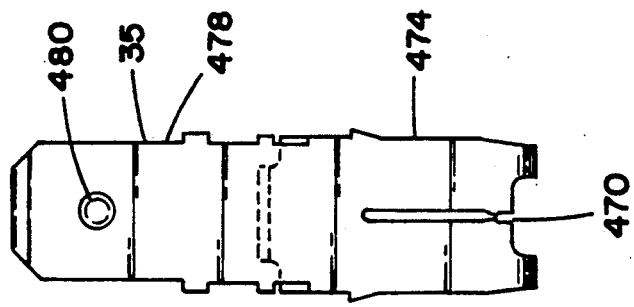
FIG. 17 is a rear elevational view of the MAG-MATE ® terminal shown in FIG. 15.
Figure 16:
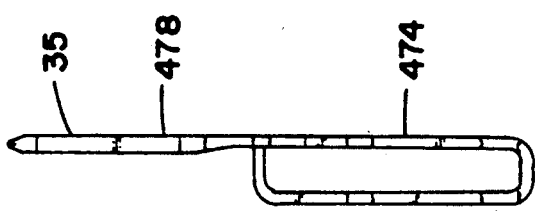
FIG. 16 is a side elevational view of the MAG-MATE ® terminal shown in FIG. 15.

Lead plug accepting structure 485 is located on upper surface 490 of stator terminator cover 40, FIG. 18. Lead plug accepting structure 485 comprises an upper wall 532, a lower wall 534, a right wall 536, and a left wall 538 as shown and oriented in FIG. 17. Walls 532, 534, 536 and 538 are constructed to create rectangular-shaped accepting structure 485.

Preferably, lead plug accepting structure 485 further comprises a first cylindrical screw boss 542 and a second cylindrical screw boss 544, FIG. 18. First cylindrical screw boss 542 is hollow and is positioned adjacent first inner aperture 515. Second cylindrical screw boss 544 is hollow and is positioned between but adjacent both fourth middle aperture 518 and right outer aperture 519, as shown in FIG. 18. A partial center wall 546 is positioned adjacent first cylindrical screw boss 542 and is perpendicular and attached to upper wall 532 but is unattached to lower wall 534, FIG. 18. Walls 532, 534, 536 and 538, partial wall 546 and upper surface 490 define a first cavity 548 and a second cavity 549. First cylindrical screw boss 542, second cylindrical screw boss 543 and partial central wall 546 are capable of orienting electrical plug assemblies 68 which can be inserted into lead plug accepting structure 485. Screw bosses 542 and 544 also prevent plug assemblies 68 from being assembled (inserted) into the wrong cavity. Once the electrical plug assemblies 68 are inserted into lead plug accepting structure 485, terminals 35 become electrically connected to plug assemblies 68. The plug assemblies 68 may then be permanently attached with screws (not shown) for heavy vibration application.

Figure 19:
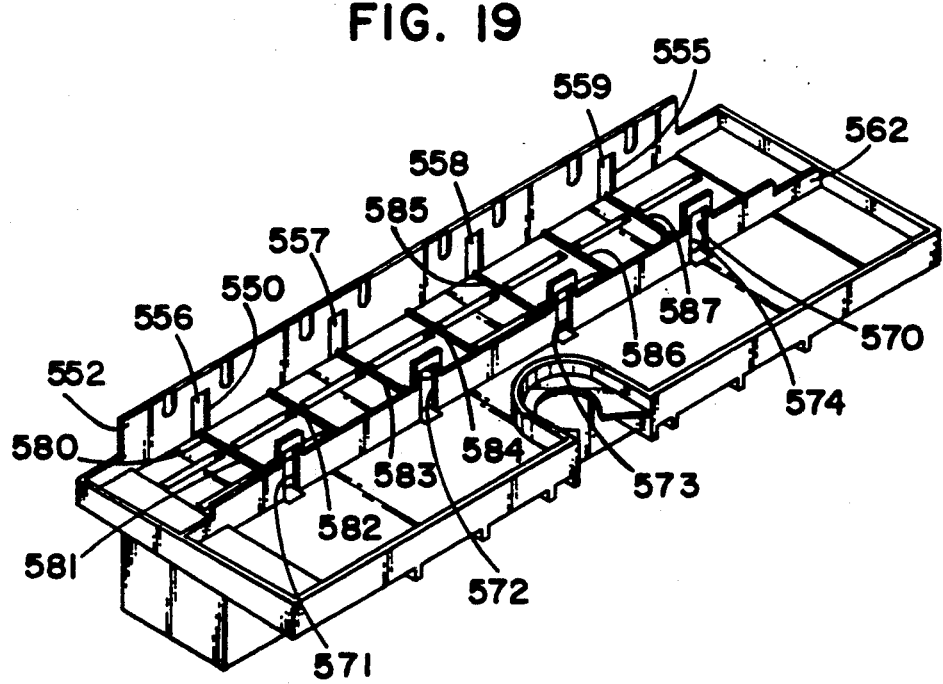
FIG. 19 is a perspective view of the stator terminator cover depicted in FIG. 18.

Referring to FIG. 19, which is a perspective view of stator terminator cover 40 taken toward a bottom side of the terminator cover, a cover locking arrangement 550 is illustrated. Cover locking arrangement 550 operates to interlock with locking tab arrangement 375 of stator terminator 30. Cover locking arrangement 550 helps anchor and orient stator terminator cover 40 to stator terminator 30.

Cover locking arrangement 550, as oriented in FIG. 19, comprises a posterior wall 552 comprising a plurality of posterior female locking catches 555. Posterior female locking catches comprise a left outer female locking catch 556, a first inner female locking catch 557, a second inner female locking catch 558, and a right outer female locking catch 559. Posterior female locking catches 556, 557, 558 and 559, FIG. 19, operate to interlock stator terminator cover 40 with tabs 402, 404, 406, 408, FIG. 13, respectively. As stator terminator cover 40 is properly oriented and positioned atop stator terminator 30, tabs 402, 404, 406 and 408 interlock with female catches 556, 557, 558 and 559, respectively, causing the stator terminator cover 40 to be generally anchored to the stator terminator 30.

Cover locking arrangement 550 further comprises an interior wall 562 comprising a plurality of interior female locking catches 570. Interior female locking catches 570 comprise a left outer female locking aperture 571, a first inner female locking aperture 572, a second inner female locking aperture 573 and a right outer female locking aperture 574. Locking apertures 571, 572, 573 and 574, FIG. 19, also operate to interlock stator terminator cover 40 with locking tabs 412, 414, 416 and 418, FIG. 14, respectively. As stator terminator cover 40 is properly oriented and positioned atop stator terminator 30, tabs 412, 414, 416 and 418 interlock with female locking apertures 571, 572, 573 and 574, respectively. This further causes stator terminator cover 40 to be anchored to the stator terminator 30. In a preferred embodiment, cover locking arrangement 550 further comprises a plurality of ridges 580, FIG. 19, which help orient and secure stator terminator cover 40 atop stator terminator cover 40. Plurality of ridges comprise a left outer ridge 581, a first middle ridge 582, a second middle ridge 583, inner ridge 584, a third middle ridge 585, a fourth middle ridge 586, and a right outer ridge 587, FIG. 18. Ridges 581, 582, 583, 584, 585, 586 and 587, FIG. 18, of stator terminator cover 40 fit into indentations 384, 385, 386, 387, 388, 389 and 390, FIG. 13, respectively, of stator terminator 30 when stator cover 40 is placed over stator terminator 30.

ASSEMBLY OF STATOR TERMINATION ASSEMBLY AND TERMINATION OF STATOR WIRES

With stator termination assembly 20 as defined above, stator gate member 25 can be flexed apart with handle portions 98 and 99 so that stator gate member 25 can be placed around the central stator lamination assembly 24 having a plurality of stator wires 22 thereon. As the gate member 25 is positioned around stator lamination assembly 24, arcuate mounting portion 55 (in a preferred embodiment, mounting bracket 85 and snap tangs 94 and 96) locks around stator portion winding wires 22 orienting gate member 25 to advantage. In this orientation, the arcuate mounting portion 55 circumscribes at least a portion of the rotor central bore 15. The orientation of gate member 25 with respect to stator terminator 30 permits stator magnet wire extensions 63 to be led immediately through plurality of channels 64 which have open ends radially-spaced along arcuate configuration 170 of stator gate member 25. As seen in FIG. 2, one of the stator magnet wire extensions 63 is isolated in spaced relation from at least one other stator coil magnet wire extension and is in an arcuate path circumscribing at least 90° of the central rotor bore 15. After the stator magnet wire extensions 63 are led through plurality of channels 64, they are inserted into retaining structure 65 (in a preferred embodiment, hooking arrangement 66).

Stator terminator 30 is mounted into place, FIG. 4, atop stator lamination assembly 24. This is accomplished when leg portions 256 and 257 are inserted into apertures 261 and 263 of stator lamination assembly 24 of stator 10. Leg portions 256 and 257 are inserted into apertures until receiving slots 270 and 272 of stator terminator 30 engage the gate member 25. Stator magnet wire extensions 63 are then led from retaining structure 65 through guiding channel arrangement 275 to terminal accepting structure 284. As stator magnet wire extensions 63 are through terminal accepting structure 284 they are positioned through a groove arrangement 345, and across first row of terminal pockets 316 and a second row of terminal pockets 318.

Terminals 35 are then loaded into the terminal accepting structure 284 (in a preferred embodiment, terminal pockets 285). Terminals 35 cut into insulation coating 23 of stator magnetic wire extensions 63 as they engage terminal accepting structure 284. Insulation coating 23 is cut as the MAG-MATE® terminal 35 traps stator magnet wire extension 63 between profile 470 of MAG-MATE® terminal 35 and projecting portions 342. As a result, an electrical connection is made between stator coil magnet wire extensions 63 and, terminals 35. At this time the excess magnet wire extensions 63 is trimmed off.

Stator terminator cover 40 is then positioned and oriented to connect to stator terminator 30. Cover locking arrangement 550 engages locking tab arrangement 375 as terminator cover 40 is lowered onto terminator 30. Cover locking arrangement 550 is lowered until it interlocks with tab arrangement 375 such that stator terminator cover 40 is anchored to terminator 30.

Plurality of apertures 500 permit MAG-MATE® terminals 35 to penetrate upper surface 490 and partially protrude from upper surface 490 of lead plug accepting structure 485. An electrical plug assembly 68 is then placed into lead plug accepting structure 485. This results in an electrical connection between the upper head portion 478 of MAG-MATE ® terminals 35 and electrical plug assembly 68. Screw bosses 542 and 543 ensure that electrical plug assembly 68 is properly oriented to ensure a proper electrical connection.

What is claimed is:

1. A stator termination assembly for mounting on a stator lamination assembly having a central rotor bore extending therethrough and stator coils wound therein; said stator termination assembly comprising:
   (a) a gate member having a mounting portion; said mounting portion being constructed and arranged to circumscribe at least a portion of the central rotor bore; and
   (b) said gate member further including means for leading a plurality of stator coil magnet wire extensions, from the stator lamination assembly, in spaced relation to one another and in arcuate paths at least partially circumscribing said central rotor bore; said means for leading a plurality of stator coil magnet wire extensions being constructed and arranged to maintain said wire extensions spaced from one another as each is directed along a corresponding one of said arcuate paths.

2. A stator termination assembly according to claim 1 wherein said mounting portion has an arcuate configuration.

3. A stator termination assembly according to claim 2, wherein said mounting portion has an inner wall with an inner surface defining a circular arch of at least about 200°.

4. A stator termination assembly according to claim 3, wherein said circular arch is between about 200° and 270°.

5. A stator termination assembly according to claim 3, wherein said mounting portion further comprises an outer surface having a plurality of channels defined by a plurality of arcuate channel walls and said outer surface.

6. A stator termination assembly according to claim 2, wherein said mounting portion has two arcuate end points which are equidistant from a center arcuate point located on an inner wall having an inner surface of said mounting portion, said mounting portion further comprising a mounting bracket positioned at said center arcuate point; said mounting bracket being constructed and arranged for interlocking around a stator winding so that said gate member is operably anchored to the stator lamination assembly.

7. A stator termination assembly according to claim 2, wherein said mounting portion has two arcuate end points which are equidistant from a center arcuate point located on an inner surface of said mounting portion, said mounting portion further comprising two snap tangs which are equidistant from each other with respect to said center arcuate point and at least about 200° radially-spaced from one another; said tangs being constructed and arranged for locking around a stator wire so that said gate member is anchored onto the stator lamination assembly.

8. A stator termination assembly according to claim 1, wherein said means for leading a plurality of stator magnet wire extensions comprises a plurality of spaced channels.

9. A stator termination assembly according to claim 8 further comprising means for collecting and retaining said plurality of stator coil magnet wire extensions from said channels.

10. A stator termination assembly according to claim 9 wherein said means for collecting and retaining a plurality of stator magnet wire extensions comprises a hooking arrangement including a retaining wall having at least two hooking apertures.

11. A stator termination assembly according to claim 8, wherein each of said plurality of channels has an arcuate configuration.

12. A stator termination assembly according to claim 11, wherein each of said channels has an open entrance end, each of said open entrance ends being radially-spaced along said arcuate configuration.

13. A stator termination assembly according to claim 1, having a handle portion on end points of said mounting portion.

14. A stator termination assembly according to claim 1, wherein:
   (a) said gate member further includes means for collecting and retaining said plurality of stator magnet wire extensions in spaced relation to one another; and
   (b) said stator termination assembly further including a terminator selectively attachable to said gate member, and constructed and arranged to operably accept stator magnet wire extensions.

15. A stator termination assembly according to claim 1, wherein said means for leading a plurality of stator magnet wire extensions comprises:
   (a) an outer surface of an outer wall of said mounting portion; and
   (b) a plurality of channel walls positioned on, and attached substantially perpendicular to, said outer surface.

16. A method of terminating motor and generator stators including a stator lamination assembly having a central rotor bore extending therethrough and a plurality of stator winding wires thereon; wherein each said stator winding wire has stator magnet wire extensions leading from stator lamination assembly, said method including the steps of:
   (a) mounting a gate termination assembly on said stator lamination assembly with said arcuate mounting portion circumscribing at least a portion of the rotor central bore, wherein said gate member has:
      (i) means for leading a plurality of stator coil magnet wire extensions, from the stator lamination assembly, in spaced relation to one another, and in arcuate paths at least partially circumscribing said central rotor bore; and means for leading a plurality of stator coil magnet wire extension being constructed and arranged to maintain said wire extensions spaced from one another as each is directed along a corresponding one of said arcuate paths; and
      (ii) retaining means for collecting and retaining said stator coil magnet wire extensions which have been guided through said means for leading a plurality of stator coil magnet wire extensions;
   (b) guiding stator magnet wire extensions from the stator lamination assembly through said means for leading stator magnet wire extensions about said arcuate paths to said retaining means; and
   (c) hooking said stator magnet wire extensions into said retaining means.

17. A method according to claim 16 wherein said means for leading a plurality of stator coil magnet wire extensions comprises a plurality of channels.

18. A method according to claim 17 wherein said plurality of stator coil magnet wire extensions are guided through said plurality of channels.

19. A method according to claim 16 further comprising the steps of:
 (a) mounting a terminator to said stator lamination assembly; and
 (b) guiding said stator coil magnet wire extensions from said retaining means to said terminator.

20. A method according to claim 19 further comprising the step of loading terminals into said terminator.

21. A method according of claim 20 further comprising the steps of:
 (a) positioning a terminal cover over said terminator; and
 (b) lowering said cover until said cover interlocks with said terminator.

22. A method according to claim 21 further comprising the step of inserting an electrical plug assembly such that an electrical connection between said terminals and said electrical plug assembly results.

23. A stator termination assembly according to claim 1 wherein at least one stator coil magnet wire extension is isolated in spaced relation from at least one other stator coil magnet wire extension and is in one of said arcuate paths circumscribing at least 90° of said central rotor bore.

* * * * *